June 5, 1945. J. A. HEANY Re. 22,648
ALUMINOUS MATERIAL
Original Filed April 7, 1937
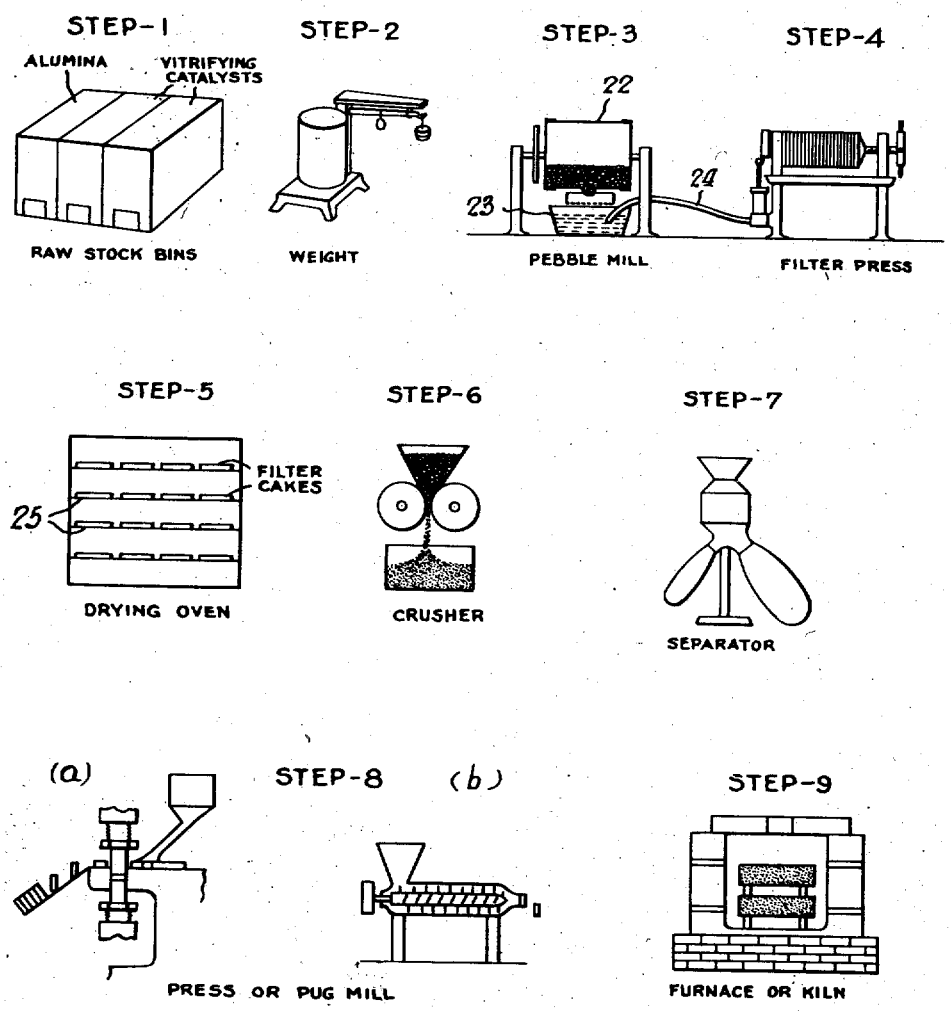
INVENTOR
John Allen Heany
BY
Brewton Whitemb & Davis
ATTORNEYS Reissued June 5, 1945

Re. 22,648

UNITED STATES PATENT OFFICE 22,648

ALUMINOUS MATERIAL

John Allen Heany, New Haven, Conn., assignor to Heany Industrial Ceramic Corporation, Rochester, N. Y.

Original No. 2,278,442, dated April 7, 1942, Serial No. 135,369, April 7, 1937. Application for reissue April 6, 1943, Serial No. 482,060

25 Claims. (Cl. 106—62)

The present invention relates to making ceramic articles from alumina, and particularly relates to processes of preparing a hard, dense, amorphous and vitreous ceramic material from alumina without fusion.

The present invention is particularly directed to producing ceramic materials from relatively pure hydrated aluminas containing substantially less than 5% of other oxides, and preferably containing less than a total of 1% of silica, iron oxide, the alkali metal oxides and/or titanium oxide.

Although the present invention is particularly described in connection with its application to hydrated alumina, it is to be understood that it is also applicable less preferably to nonhydrated alumina ($Al_2O_3$) as well as to other ceramic oxides and materials whether in hydrated or unhydrated condition.

Generally, considerable difficulty has been experienced in forming ceramic material of alumina, and it has been customary therefore, to fuse the alumina which will result in the production of a non-amorphous, crystalline product, and which will require the utilization of expensive electric furnace equipment. Moreover, it is generally necessary to include substantial quantities of bonding or fluxing agents, which not only introduce impurities into the final ceramic and decrease its refractory and other desirable qualities, but which in addition frequently result in its being porous, of low density and of non-vitreous character.

It is, therefore, among the objects of the present invention to produce dense, hard, non-porous, vitreous, amorphous ceramic articles, such as abrasives, refractories, and so forth, from alumina in hydrated or unhydrated condition, relatively devoid of iron, titanium and silicon oxides, by ceramic forming and firing processes, without the necessity of resorting to expensive fusions in electric furnaces and without the need of utilizing fluxing or bonding agents.

Other objects will be apparent during the course of the following specification.

It is an important feature of the present invention that the alumina be converted into a ceramic without fusion and without the inclusion of bonding or fluxing agents, which would tend to fuse in the mass during firing.

It has been found that when alumina has been crushed and then ground to a very small size, preferably in the presence of a greater amount of water, for over twenty hours, that the alumina tends to acquire ceramic activity and a colloidal nature, which permits the aluminous material to be formed by ordinary ceramic processes and then fired at a temperature between 1200° C. and 1600° C. to produce ceramics of very high quality and of hard, dense, vitreous, non-crystalline and amorphous character.

According to the preferred procedure, the alumina, either in hydrated or dehydrated condition, is wet ground in a pebble or ball mill until the particles thereof appear to acquire the nature of a suspensoid, which will tend to remain suspended in the grinding water. In this connection it has been found generally desirable to add separately to the alumina before the colloidizing grinding process, small quantities of alkaline or basic and acid oxides as vitrification catalysts. These substances must not act as bonding or fluxing agents. The preferred basic oxides are those of the alkali metals or alkali earth metals, magnesium oxide being preferred. The preferred acid oxides are those such as silica, boron oxide, and so forth.

The preferred oxides should be insoluble in water and should be added in substantially pure condition, in amounts less than 20% and preferably substantially less than 10%. In the preferred procedures the amount of the added oxides is maintained between 5% and 1%.

The preferred composition contains 95% $Al_2O_3$, 2% MgO and 3% $SiO_2$. This corresponds to about 950 parts by weight of $Al_2O_3$, 20 parts of MgO and 30 parts of $SiO_2$. Although these proportions are preferred, the amount of $Al_2O_3$ may be varied from 80% to 95%, and the following proportions have been found to be satisfactory for many purposes:

| | Percent | | Percent |
|---|---|---|---|
| $Al_2O_3$ | 80.0 | $Al_2O_3$ | 90.0 |
| MgO | 8.0 | $SiO_2$ | 6.0 |
| $SiO_2$ | 12.0 | MgO | 4.0 |

| | Percent | | Percent |
|---|---|---|---|
| $Al_2O_3$ | 95.0 | $Al_2O_3$ | 99.0 |
| $SiO_2$ | 3.0 | $SiO_2$ | 0.6 |
| MgO | 2.0 | MgO | 0.4 |

The hydrated alumina, which is preferably utilized as the material to which these oxides are added, may be of the following compositions.

A grade (amorphous plastic ignited alumina):

| | Percent |
|---|---|
| Loss on ignition | 0.42 |
| $SiO_2$ | 0.03 |
| $Fe_2O_3$ | 0.022 |
| $Na_2O$ | 0.41 |
| $TiO_2$ | 0.005 |
| Absolute moisture | 0.98 |
| $Al_2O_3$ | By difference |

CX grade (amorphous plastic hydrated alumina):

| | Percent |
|---|---|
| Loss on igintion | 34.39 |
| $SiO_2$ | 0.01 |
| $Fe_2O_3$ | 0.003 |
| $Na_2O$ | 0.26 |
| $TiO_2$ | 0.005 |
| Absolute moisture | ----- |
| $Al_2O_3$ | By difference |

It is preferred to start with A grade alumina, which should not have been ignited sufficiently to change the amorphous, plastic character of the material. This grade will give less shrinkage than the CX grade. The alumina even when ignited should contain some water of hydration, say about ½% to 5%.

Where the alumina is first dehydrated before combination with the magnesia and silica oxides or other basic and acid oxides, such ignition may be carried out, either by batch or continuous process, (such as a Ruggles Cole furnace) to reduce the moisture to about 1% to 2%. In any case, during this dehydration or ignition operation, the temperature should at all times be maintained not substantially above the red heat, and preferably between 500° C. and 600° C., so that the alumina will not lose its amorphous and plastic character. The alumina should always be plastic, amorphous and non-crystalline before grinding. However, it is generally desirable to mix the hydrated alumina with the proper percentages of magnesium oxide and silica before the grinding operation, although these materials may, in some cases, be added after the grinding operations, or in part before and in part after the grinding operations. The grinding not only assures hydration and colloidization of the MgO and $SiO_2$, but also causes a more thorough dispersion thereof.

Generally, at the conclusion of the wet grinding, or colloidizing, the alumina and metal oxides should have become partly hydrated, the alumina taking up about 3% to 7% additional water, and the silica usually remaining substantially unhydrated. Where the hydrated alumina is in lumpy condition, the material is first crushed and then may be dry ground before being wet ground. The grinding operation, if desired, may take place in two steps, the crushed material first being subjected to grinding in a hammer mill and in dry condition, and then being subjected to wet grinding in a ball or pebble mill, this latter operation preferably being performed for several hours and with an amount of water varying from one to five times the amount of solids being ground. Usually the grade A or CX alumina above referred to is immediately suitable for wet grinding.

In any case, the grinding should be continued so that a major proportion of the material being ground will be of a fineness smaller than 50 microns, and preferably finer than 20 microns. In the preferred procedure, at least 91% of the material is finer than about 12 microns, and the majority of the particles ranging from 0.8 to 9.0 microns in size. It is desirable to obtain a relatively uniform particle size in the final mixture.

When the material has been ground to this fineness in water, it is found that the alumina and also the magnesia and silica, if they have been included, have been converted into a substantially colloidal condition, or have been mechanically hydrated so that the particles are more readily suspended in water and do not very readily separate.

As a typical mixture which is produced as a result of this grinding process, the following may be given:

| Particle size in microns | Percentage of particles finer |
|---|---|
| 35 | 95 |
| 21 | 94 |
| 16 | 93 |
| 11 | 92 |
| 9 | 91 |
| 6.5 | 91 |
| 4.5 | 88 |
| 3.3 | 81 |
| 2.7 | 74 |
| 2.2 | 64 |
| 1.9 | 57 |
| 1.1 | 36 |
| 0.8 | 24 |

Specific gravity, 3.50.

Aluminous materials of these particle sizes, particularly in the presence of basic and acid oxides, appear to be able to vitrify or be converted into ceramic materials at very low temperatures, substantially below the melting point of alumina, magnesia or silica.

In wet grinding or colloidizing the alumina it is generally desirable to use a flint-lined pebble mill with flint pebbles, and the grinding should be carried out under such conditions that the alumina will not take up more than about ¼% to ¾% of silica from the mill. It is generally desirable to use 25% of the aluminous composition and 75% water to make the grinding slip. The time of grinding is dependent upon the size of pebble mill, the size of pebbles, quantity used and the speed of the mill. With a small mill, one gallon size, good results are obtained with fifty hours grinding, the weight of the charge being one kilogram of aluminous composition and three kilograms of water, and the mill being about one-half full of pebbles of approximately ¾'' diameter. The larger the mill, the less grinding time required, due to the greater action of the pebbles. The time of grinding, however, may be varied from ten to sixty hours, and the amount of water from 35% to 85% of the mix in the pebble mill.

The material, after grinding, may be dried directly, but it is preferably partly dehydrated by filter pressing. The filter cake which is formed should preferably not contain more than about 5% to 10% of water, and it may be dried at a temperature not substantially exceeding about 200° C. and at the most not exceeding 500° C. to 600° C. to reduce the filter cake to a water content of about 1% or 2%.

This filter cake, which after drying is relatively shrunken and dense, may be moistened or dampened, if desired, to break it up into a large number of small blocks or particles which may then be directly fired between 1200° C. and 1600° C., or preferably to between 1450° C. and 1500° C., to produce granules of a non-porous, dense, hard, amorphous, vitreous or vitric-like ceramic, having a density of about 3.68. The temperature should be below 1700° C. and usually not above about 1600° C. A temperature of 1500° C. is most generally satisfactory. Temperatures below 1450° C. do not always result in complete vitrification. These granules may be crushed and screened for use as abrasives or for other purposes.

This dampening of the filter cake may be accomplished by placing the dried cake upon a moisture-containing absorbent material. The moistening may also be accomplished by steaming the dried cake.

It is also possible to take the filter cake containing an amount of water up to 5% or 10% and, if desired, without drying, pass it through a pugging mill, preferably with the addition of sufficient water to enable the material to be extruded in the form of tubes or rods, which then can be fired at the above temperatures.

The material from the wet grinding operation may also be slip molded or formed in various ways into various shapes, such as crucibles, plates, disks, and so forth, and subsequently fired at varying temperatures between 1200° C. to 1600° C., and preferably between 1450° C. and 1500° C.

It has been found that the material has a relatively low shrinkage of the order of less than 30%, and preferably about 25% to 28% during the firing operation.

During the firing, and during cooling after firing, the atmosphere above the material may be maintained in oxidizing or reducing condition. It has been found particularly satisfactory to introduce combustion gases in the atmosphere, either during the firing or during cooling, or both.

The final hard, non-porous, amorphous, non-crystalline, vitric-like or vitreous, white-colored ceramic materials are dense with a specific gravity of 3.68, have a melting point substantially the same as pure alumina, and have a hardness of 71 to 74 on the Rockwell C scale. They may be utilized for stoneware, refractory bricks, abrasives, nozzles for sand blasting, dies for wire drawing, crucibles, refractory vessels, tubing, translucent panels, pyrometer tubes, dies, furnace linings, muffles, combustion tubes, tiles, combustion boats, pebbles for pebble mills, non-slip treads, mortars and pestles, casseroles, spatulas, hearth plates, saggers, jaws for crushing apparatus, drills, chemical stoneware, pottery, textile guides, electric furnace cores, bearings for clocks and instruments, linings for ball and pebble mills, and so forth.

The ceramic materials produced according to the present invention break with a conchoidal fracture and do not have cleavage planes.

The accompanying drawing shows in diagrammatic fashion the various steps utilized in obtaining the desired ceramic according to the present invention.

Step 1 indicates the raw stock bins containing the hydrated alumina or other ceramic material, acid vitrifying catalytic oxide, such as silica, and the basic vitrifying catalytic oxide such as magnesia.

Step 2 indicates the weighing of the materials off into the desired size batches, containing for example, 98 parts by weight of $Al_2O_3$, 2 parts by weight of MgO and 3 parts by weight of $SiO_2$. Instead of a batch treatment it is also possible to use a continuous process.

In step 3, the alumina as such, or after it has been partly or wholly dehydrated at 500° C. to 600° C. and/or after it has been crushed and dry ground in a hammer mill, is placed in a pebble mill to be ground with water and the accessory magnesia and silica.

The material discharged from this pebble mill 22 into the pan 23 may be screened to remove sand or particles from the pebbles and walls of the mill. The slurry or suspension may then be conducted by the pipe 24 to the filter press diagrammatically indicated in step 4.

In step 5, upon the shelves 25, the filter cakes are dried, for example up to a temperature of 100° C. and preferably to about 8% to 10% of water with shrinkage and densification.

In step 6 the dried filter cakes are crushed, and also ground if desired, and in step 7 the coarse particles may be screened out (as by a Beach-Russ separator) and returned to step 6 for recrushing.

In step 8(*a*) the material is passed through a press, while in step 8(*b*) it is passed through a pug mill. The material may be pressed in the dry or with a lubricant or with an organic binder. The pug mill may be of the type manufactured by the Ceramic Machine Company, or of the type known as the F-R-H Vacuum Pottery Pug Mill, manufactured by the Fate-Root-Heath Company of Plymouth, Ohio. In these pug mills pressure and vacuum may be applied to draw out the air from the mass so that the extruded substance is substantially devoid of air and gas bubbles. This will result in a denser and more homogeneous aluminous ceramic.

The pug mill is preferably provided with knives to first cut up the aluminous material, following which the material is picked up by an auger or Archimedes screw which presses out the material through dies to form sheets or cylinders or tubes. If desired, the filter cake may be pugged and formed directly after step 4 without drying and crushing.

In making abrasives, it is usually desirable to employ steps 1, 2, 3, 4, 5, 6, 7, 8(*a*) and 9. In making formed articles it is usually desirable to use steps 1, 2, 3, 4, 8(*b*) and 9. The essential steps are steps 3 and 9.

The mass extruded from the pug mill preferably has the consistency of a thick dough and is termed a wad or stiff mud. It may be cut up into blocks, if desired, or the extruded mass may be pressed into a die or formed in a forming machine or jigger lathe or other apparatus to produce articles as above described. In any case the formed mass will not exude water.

If desired, however, the dehydrated and pugged mass may be cut up into small pieces, dried and then fired at a temperature of 1250° C. to 1350 C. The fired material may then be ground, sifted, formed or molded by ceramic processes with or without the addition of water, and again fired to a temperature of between 1450° C. and 1500° C. This firing is preferably carried out in a fuel-fired ceramic furnace or kiln which may be of the batch or tunnel type.

The firing operation may be carried out in an oxidizing atmosphere containing air, in a neutral atmosphere containing waste combustion gases, or in a reducing atmosphere containing substantial quantities of hydrogen and carbon monoxide or other reducing gases. Firing in an oxidizing atmosphere will give a harder ceramic than firing in a reducing atmosphere, while firing in a reducing atmosphere will give a harder ceramic than firing in a neutral atmosphere.

If desired, the final firing operation at 1450° C. to 1500° C. may be performed in a reducing atmosphere of combustion gas containing carbon monoxide formed in the kiln during firing or cooling, or preferably during both firing and cooling. Colored effects may also be obtained by incorporating iron, vanadium, chromium or manganese compounds in the alumina before or after wet grinding, these compounds, preferably, however, being ground in at the same time as the acid and basic vitrifying catalysts, but in amounts never exceeding a few percent.

Before the firing operation in step 9 it is most important that the plastic material contain not more than about 5% to 8% of water, and the formed material may be pre-dried if desired.

If it is desired to make abrasives, the hot disks or blocks of the ceramic from the furnace or kiln 13, or these materials after cooling and reheating to a red heat, may be suddenly cooled or be dumped directly into water with the result that the block or disk of material will crack or fissure and may be readily broken up into a large number of granules or grains having very sharp edges and of particularly satisfactory abrasive properties.

In the above procedure, it is also possible after step 5 to dampen the shrunken, dried filter cake, which may then be broken up into pieces, and these pieces may then be directly fired in the kiln or furnace of step 9 at a temperature of between 1450° C. to 1500° C. to give a ceramic directly suitable for abrasive use after crushing and/or screening.

The present application is a continuation in part of application Serial No. 684,760, filed August 11, 1933, the present application being particularly directed to fine grinding and colloidizing of the alumina before forming and firing.

The present application differs from copending applications Serial No. 87,824, filed June 29, 1936, and Serial No. 87,825, filed June 29, 1936 (Patent No. 2,310,953, issued February 16, 1943), which utilize dehydrated bauxite containing large quantities of titanium, iron and silicon oxides.

It is an essential feature of the present invention that the ceramic be substantially devoid of iron, titanium and silicon oxides as contained in bauxite, and also devoid of bonds or fluxes, such as fire clay, lime, magnesium silicate, talc, steatite, and so forth. It is to be noted that the results of the present invention cannot be obtained with MgO or $SiO_2$ alone as vitrification catalysts, or in chemical combination with each other as catalysts. The magnesia and silica should each be relatively pure and be added separately to the alumina as such. Although in certain instances, magnesium silicate and chemical compounds including magnesia and silica and even alkali metal oxides may be utilized, these are generally not as satisfactory as the separate addition of magnesia and silica. Other alkali earth metal oxides are not as suitable as magnesia. The magnesia, when added, should be preferably added in proportions between 8.0% and 0.4%, and the silica in proportions between 12.0% and 0.6%, the residue being alumina, which should constitute between 80% and 99% of the mixture before step 3.

It is to be understood, however, that the processes described in the present application are also less desirably applicable to mixtures of alumina with other ceramic oxides and materials, and also to other ceramic oxides such as magnesium oxide.

The finely divided aluminous material produced according to the present invention after steps 3 and 4 might be readily used as a bonding agent in connection with other ceramics, such as those composed of silicates, magnesium oxide, and so forth; or after firing, the granular alumina may be utilized as a filler in making other ceramic materials.

The pulverized vitrified ceramic is also generally useful in ceramic procedures as well as in other connections.

It is apparent that many changes could be effected in the processes and procedures above described, and in the specific details thereof, without substantially departing from the invention intended to be defined in the claims, the specific description herein merely serving to illustrate certain compositions by which, in one embodiment, the spirit of the invention may be effectuated.

What I claim is:

1. A vitreous-like, dense, non-porous, hard ceramic article containing 80% to 99% $Al_2O_3$, 0.6% to 12% $SiO_2$ and 0.4% to 8% MgO, possessing a conchoidal fracture and a hardness of at least 71C on the Rockwell hardness testing machine, formed of conglomerated coherent particles, the major proportion of which having a diameter less than 50 microns.

2. The method of producing a hard, dense, non-porous, non-fused, fired refractory body which comprises dehydrating hydrated alumina at about a red heat until substantially all of the moisture has been removed therefrom, mixing together between about 5 to 20 parts of finely divided magnesium oxide and silicon dioxide with between about 95 to 80 parts of the dehydrated aluminum oxide, wet grinding to a fineness of less than 50 microns, forming the mixture into the shape desired, and thereafter subjecting the same to a temperature above 1200° C. and below the fusing point of any of the ingredients comprising said mixture, said aluminum oxide being amorphous and substantially devoid of titanium oxide and iron oxide, said magnesium oxide and silicon dioxide being added as such and not in combination with each other.

3. The method of producing hard, dense, non-porous, non-fused, fired vitreous aluminum oxide which consists in dehydrating hydrated aluminum oxide at a temperature between about 500° to 600° C., grinding the dehydrated oxide to a fineness preferably in the neighborhood of 12 microns, adding a small percentage of finely ground silica and magnesia, forming the resulting material, and heating to a temperature sufficient to bring about vitrification, the aluminum oxide making up between about 80% to below 99% of the mixture, said aluminum oxide being amorphous and substantially devoid of titanium oxide and iron oxide, said silica and magnesia being added as such and not in combination with one another.

4. The method of producing hard, dense, non-porous, non-fused, fired vitreous articles which comprises dehydrating alumina at about a red heat, wet grinding together dehydrated alumina, silica and magnesia to a fine powder of the order of 5 to 20 microns in size, thus mechanically hydrating it, adding water to secure a mixture suitable for molding, forming the resultant mixture in suitable molds, and finally subjecting the formed material to a vitrifying temperature not exceeding 1500° C., said alumina making up between 80% to below 99% of the mixture, said alumina being amorphous and substantially free of titanium and iron oxides, said silica and magnesia being added as such and not in combination with one another.

5. A method of making a vitreous-like, dense, non-porous, hard alumina ceramic having a conchoidal fracture which comprises dehydrating a hydrated alumina at about 500° to 600° C., mixing it with a small amount of silica and magnesia as vitrification catalysts, wet grinding it to a fineness of less than about 50 microns, and then firing.

6. An unfused, hard, dense substance possessing a conchoidal fracture and no cleavage planes, and consisting of a conglomerated and closely adherent mass of alumina, magnesia and silica particles, the major portion of which having a size less than 50 microns and the alumina forming not less than 80% of the mass.

7. The method of making a vitreous-like, dense, non-porous, hard, fired aluminous material, having a conchoidal fracture, which comprises heating hydrated alumina to between about 500° and 600° C. to remove most of the water thereof, crushing the dehydrated alumina, dry grinding the crushed alumina to about 200 mesh, separating the particles over 200 mesh, wet grinding the 200 mesh material with not over 20% of magnesia and silica until at least 50% thereof is finer than 20 microns, filter pressing the wet ground material, drying the filter cake and thereafter forming and firing at a temperature between 1200° and 1500° C.

8. A process of making a vitreous-like, dense, non-porous, hard, fired alumina ceramic from hydrated alumina, which comprises heating said hydrated alumina at a temperature of about a red heat until it loses substantially all of its water, then successively crushing, dry grinding and wet grinding, the dry grinding being continued until the material has been ground to less than 200 mesh, and the wet grinding being carried out until the material has been ground to less than 50 microns, adding about 3% of silica and about 2% of magnesia as vitrification catalysts to said wet grinding, and then forming and firing.

9. A powder containing 80% to 99% alumina, 0.6 to 12% silica and 0.4 to 8% magnesia which on firing to a temperature below fusion forms a dense, hard, non-porous substance.

10. A vitreous-like, dense, non-fused, non-porous, hard ceramic article containing 80 to 99% alumina, 0.6 to 12% silica and 0.4 to 8% magnesia.

11. A dense, non-porous, alumina-containing substance consisting of a conglomerated and closely adherent mass of alumina particles mixed with minor additions of magnesia and silica particles, the major portion of the particles prior to firing having a size less than 50 microns and the alumina forming at least 80% of the mass.

12. A dense, non-porous aluminous article containing 80 to 99% alumina, 0.6 to 12% silica and 0.4 to 8% magnesia, in mixed particle form, the major proportion of the particles prior to firing having a diameter less than 50 microns.

13. The method of making ceramic articles which consists in preparing a finely pulverized mixture consisting of from 80 to 99% alumina, from 0.6 to 12% silica and from 0.4 to 8% magnesia, shaping the article therefrom and sintering the article to a non-porous state while maintaining the shape of the article.

14. The method of making ceramic articles which consists in preparing a finely pulverized mixture consisting of from 80 to 99% alumina, from 0.6 to 12% silica and from 0.4 to 8% magnesia, shaping the article therefrom and sintering the article to a non-porous state while maintaining the shape of the article, at temperatures below 1700° C.

15. An unfused, dense, fired alumina possessing a conchoidal fracture and no cleavage planes, having a hardness of over 71C on the Rockwell scale, formed of a conglomerated and closely coherent mass of collodized, alumina particles, the major portion of which having a fineness of less than 50 microns, with additions of magnesia and silica not exceeding 20%.

16. A vitreous-like, dense, non-porous, hard, aluminous ceramic having a conchoidal fracture produced according to the method of claim 18.

17. The process of producing a hard, dense, homogeneous, vitreous-like, non-porous aluminous product which comprises dehydrating amorphous alumina at temperatures below that at which it becomes generally crystalline and at which hard, coagulated lumps form, grinding to a particle size in which the major portion of the material has a fineness less than 50 microns with minor additions of magnesia and silica, forming and firing at temperatures between 1200° C. and 1700° C.

18. A method of making a vitreous-like, dense, non-porous, hard ceramic from alumina which comprises heating the raw material to reduce the water of hydration to not over 5%, grinding with minor additions of magnesia and silica to a particle size in which the major portion of the material is not over 50 microns, with addition of magnesia and silica not exceeding 20% forming and firing.

19. A method of making a vitreous-like, dense, non-porous, hard ceramic from aluminous material which comprises heating alumina to reduce the water of hydration to not over 5%, wet grinding with minor additions of magnesia and silica to a particle size in which 95% of the particles are less than 50 microns, forming and firing at a temperature below the fusion temperature of the material and above 1200° C.

20. A method of making a vitreous-like, dense, non-porous, hard ceramic from aluminous material which comprises heating alumina to reduce the water of hydration to not over 5%, wet grinding with minor additions of magnesia and silica to a particle size in which the major portion of the material is not over 50 microns and rehydrating to not over 7%, forming and firing at a temperature above 1200° C. and below the fusion temperature of the material.

21. In a method of making a vitreous-like, dense, non-porous, hard aluminous ceramic having a conchoidal fracture, the steps including dehydrating a hydrous alumina at a temperature sufficient to reduce the combined water content to not over 5% and grinding it, with minor additions of magnesia and silica, to a fineness in which a major portion of the particles have a diameter less than about 50 microns, the alumina being at least 80% of the material.

22. A powder containing alumina and not over 20% of magnesia and silica which on firing to a temperature less than fusion and preferably between 1200° C. and 1600° C. forms a vitreous, dense, non-porous, hard, aluminous substance having a conchoidal fracture, produced according to the method of claim 21.

23. A dense, non-porous, sintered structure formed by firing, to a temperature below that of complete fusion, a quantity of finely ground non-plastic ceramic mixture showing upon analysis from 80 to 99% alumina and from 12% to 0.6% silica, together with 0.4% to 8% of magnesia.

24. A composition formed by sintering at temperatures in the range of 1450° C. to 1600° C. into a dense, non-porous body a finely ground mixture of non-plastic material showing on analysis from 80 to 99% alumina and from 12% to 0.6% silica, together with 0.4% to 8% of magnesia.

25. The method of making dense, non-porous bodies consisting predominantly of sintered particles, which consists in preparing a ceramic mixture showing upon analysis from 80 to 99% alumina and from 12% to 0.6% silica, together with from 0.4% to 8% magnesia, pulverizing the material to a grain size on the order of 50 microns or less, shaping the article from the mixture and firing it to temperatures on the order of from 1450° C. to 1600° C. thereby converting it into a dense, sintered mass, while retaining the desired shape.

JOHN ALLEN HEANY.